(No Model.)
J. I. HOKE.
STRADDLE ROW WHEEL CULTIVATOR.
No. 519,631.
Patented May 8, 1894.
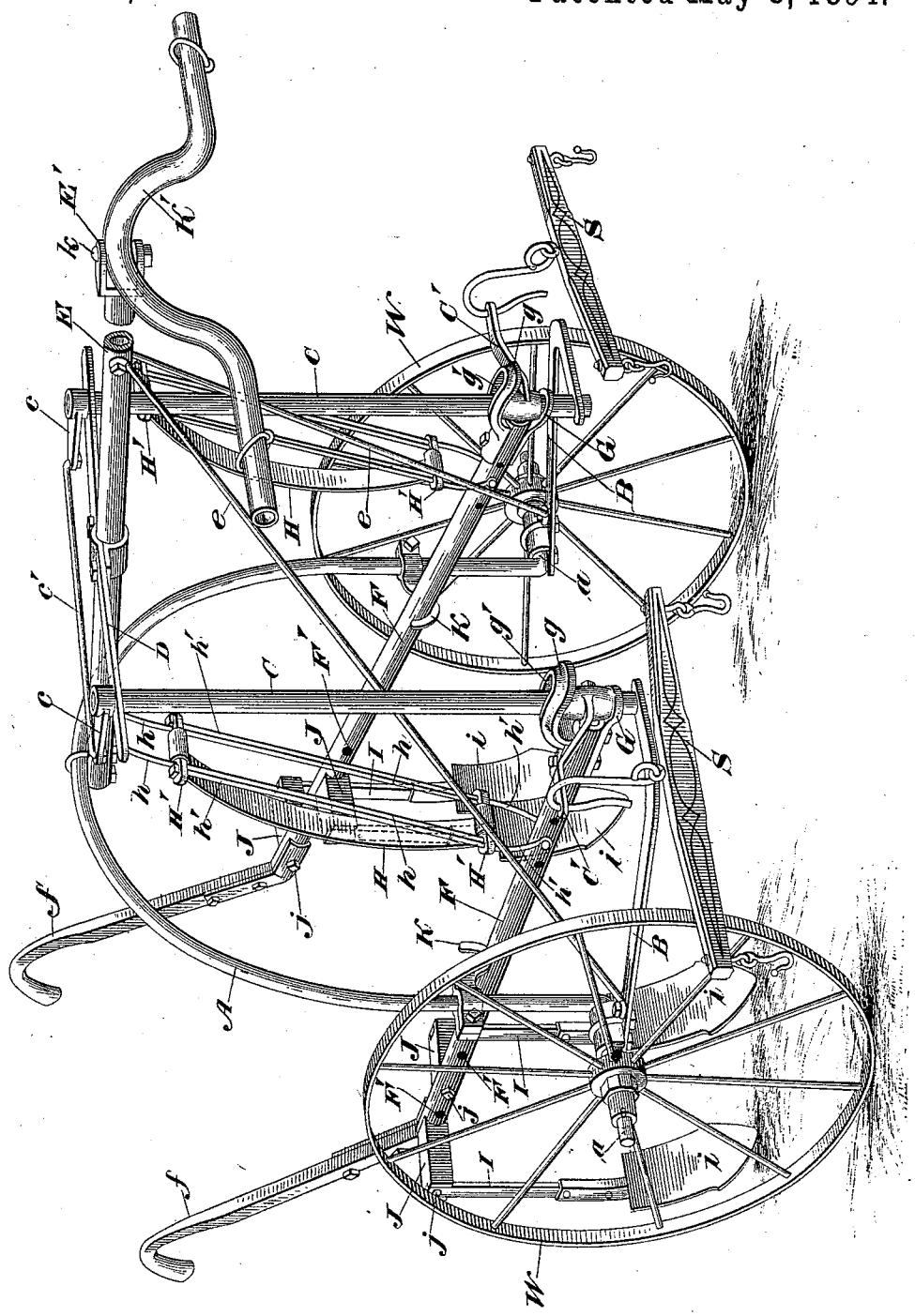
Witnesses
M. E. Fowler
James K. Mansfield
Inventor
John I. Hoke
by Alexander & Dowell
Attorneys

UNITED STATES PATENT OFFICE.

JOHN I. HOKE, OF SOUTH BEND, INDIANA.

STRADDLE-ROW WHEEL-CULTIVATOR.

SPECIFICATION forming part of Letters Patent No. 519,631, dated May 8, 1894.

Application filed September 28, 1893. Serial No. 486,662. (No model.)

*To all whom it may concern:*

Be it known that I, JOHN I. HOKE, of South Bend, in the county of St. Joseph and State of Indiana, have invented certain new and useful Improvements in Straddle-Row Wheel-Cultivators; and I do hereby declare that the following is a full, clear, and exact description thereof, reference being had to the accompanying drawing, and to the letters of reference marked thereon, which form part of this specification.

This invention is an improved straddle-row wheel-cultivator and its objects are to produce a strong, light, cultivator formed entirely of metal and principally of tubing, and in which the cultivators will be permitted the desired play independently of each other, and to connect the single-trees to the cultivator beams without the intervention of a doubletree, in such manner that the draft will be directly transferred to the cultivator beams, and at the same time the draft strain on the two cultivators equalized.

The invention consists in the novel constructions and combinations of parts hereinafter described and as summarized in the claims.

In the drawing forming part of this specification the figure is a front perspective view.

Referring to the drawing by letters—the axle A of the machine is bent like an inverted U to straddle a row of plants, its extremities being bent horizontally outward to form journals $a$ upon which the supporting wheels W, of any suitable construction, are mounted. To each journal $a$, at the inner side of the wheel, is secured by clips, or in other suitable manner, the rear end of a bar B which projects forward slightly beyond the wheel, and is then bent inward toward the opposite bar as shown. Through openings in the inner ends of said bars pass the lower ends of vertical shafts C, the upper ends of which pass through openings in the ends of a cross bar D clipped or otherwise secured transversely on the draft-pole E, whose rear end is clipped or otherwise secured to the center and highest point of the axle.

On the upper ends of shafts C C are secured crank arms $c, c$, which are parallel with each other and normally parallel with pole E also; the extremities of arms $c$ are connected by a rod $c'$ so that the rotation of one shaft similarly rotates the other. On the lower ends of shafts C, just above bars B, are secured crank arms C' which stand at right angles to arms $c$, and normally at right angles to draft pole E also, pointing outward and oppositely. The singletrees S are linked to the extremities of arms C', which may be curved in such manner as to support the singletrees the desired height above the ground. It will be readily understood that by this construction when one single-tree is pulled forward the arm C' to which it is attached tends to rotate the connected shaft C, and through crank arms $c$ and rod $c'$ the opposite shaft C is similarly turned, thereby moving the opposite arm C' backward with its singletree, and vice versa. Thus a perfect equalizing device is formed comprising among its members the shafts C, C, which are in fact the draft-beams of the machine, as to them are attached the cultivator beams, as hereinafter described.

$e, e$, designate stay rods connected to the pole in front of bar D and to the bars B, or the journals $a$, so that shafts C C are pulled or pushed forward at both top and bottom, and the main axle kept in perpendicular position.

The cultivator beams F, F, may be of any desired construction, but as shown they are simply straight tubes, and the standards I, I, of the cultivator shovels $i, i$, are connected to the rear ends thereof by means of blocks J and bolts $j$ which pass through corresponding openings in the upper ends of the standards, the blocks and beams, and are secured by suitable nuts. This construction enables me to provide for adjustment of the cultivators on the beams by simply forming a series of openings F' in the beam through any of which bolts $j$ can be passed. The handle bars $f$, (one for one each beam) may be formed therewith, or be detachably secured thereto by bolts as shown in the drawing.

To the front end of each beam F is secured the devices for connecting it to a shaft C, which, as shown, consist of two castings or plates G, $g$, which are respectively secured to the bottom and top of beam at the forward end thereof by bolts or rivets, and project beyond the beam. Plate G has simply an eye in its end through which shaft C loosely passes while casting $g$ has its projecting end curved upwardly and longitudinally slotted as at g' for the passage of the shaft. In putting the machine together the hub of arm C' is loosely embraced between the plate G and casting g, and all stand above bar B, as shown in the drawing. These devices for attaching the beams permit them to swing laterally on shafts C, and also to swing vertically, to a limited extent, so that the cultivators can readily accommodate themselves to inequalities in the surface being cultivated, but do not permit the beams to rotate. Obviously a mechanic could make casting g and plate G in one piece, and even integral with the beam, if desired, such constructions I therefore consider covered by my claims, except where the parts are distinctly specified as being separate.

In order to facilitate the manipulation of the cultivators by the driver I employ spring supports therefor. As shown flat bow springs H are used, and provided with cross pieces H' on their ends, each cross piece having guide openings through it for the passage of rods h h', respectively. Rods h are connected at their lower ends to the lower cross-piece H' of the spring, pass through the guide openings in the upper cross piece H', and are attached by their upper ends to the cross piece D, or other convenient support, in any suitable manner. Rods h' are attached at their upper ends to the cross piece H' on the upper end of the spring, pass through the openings in the lower cross piece thereof, and are attached to the adjoining cultivator beam, substantially as shown in the drawing; therefore when the beam is lowered the rods h, h', telescope or slide in relation to each other and spring H is more or less bowed. Single rods could be used in connection with the bow spring. If desired a helical spring could be substituted for the bow spring, this latter form is not novel, and is not as durable and cheap as that described.

Hooks K K are attached to the axle beside the cultivator beams so that the latter can be suspended thereon when it is desired to travel with the machine, or to throw the cultivators out of action. The front end of pole E is bifurcated at E' to embrace the center of the pole-yoke K' which is pivotally connected thereto by a bolt k. The pole yoke is bent like the axle so that the machine can be used to cultivate a higher growth of plants than if a straight yoke were used.

I propose making the axle, shafts, beams, draft-pole, yoke, &c., of metallic tubing or piping as indicated in the drawing for the purpose of obtaining durability, lightness and stiffness of parts.

Having thus described my invention in detail, what I claim as new is—

1. The combination of the axle, the draft pole, the transverse bar connected thereto, the vertical shafts connected at their upper ends to said bar, and the opposite bars connecting the lower ends of the respective shafts to the axle; whereby swing of said shafts is prevented with the cultivator beams having a direct double connection with the said shafts, whereby lateral and vertical movement of the beams is permitted but rotation thereof prevented, substantially as described.

2. The combination of the axle, the bars attached to the ends thereof, the draft pole, the transverse bar thereon, the vertical shafts connected to the former and latter bars, with the crank arms on the lower ends of said shafts to which single trees are to be connected, the crank arms on the upper ends of said shafts, and a connection between the uppermost crank arms, and the cultivators, each of which is attached directly to one of said shafts substantially as described and for the purpose specified.

3. The combination of the vertical shafts, their supports and the cultivators connected to said shafts; with the crank arms attached to said shafts for the attachment of the single trees, and means substantially as described whereby the rotation of one shaft causes a similar movement of the other shaft and consequently opposite movements of the crank arms, substantially as specified.

4. The combination of the axle, the draft pole, the vertical shafts on opposite sides of the poles journaled in proper supports, the draft crank arms on the lower ends of said shafts, the crank arms on the upper ends thereof, and the rod connecting the upper crank arms; and the cultivator beams connected to said shafts, substantially as described.

5. The combination of the axle, the draft pole, its cross bar, the horizontal bars attached to the axle at each side of the pole, the vertical shafts journaled in said cross bar and horizontal bars, and the cultivator beams connected to said shafts, substantially as described.

6. The combination of the axle, the draft pole, its cross bar the horizontal bars attached to the axle at each side of the pole, the vertical shafts journaled in said cross bar and horizontal bars, the draft crank arms attached to said shafts and connections whereby they are caused to turn synchronously and the cultivator beams connected loosely to said shafts, substantially as specified.

7. The combination of the axle, the draft pole, the cross bar on said pole, the horizontally disposed bars connected to the axle, and the vertical shafts journaled in said cross bar and horizontally disposed bars; with the cultivator beams and the casting g and plate G connecting them to the shafts, substantially as set forth.

8. The combination of the wheeled axle, the L-shaped bars connected thereto, the vertical shafts connected to the front ends of said bars and the cultivators attached to said shafts substantially as specified.

9. The combination of the wheeled axle, the L-shaped bars connected thereto, the draft pole, its cross bar, the shafts journaled in said cross bar and the L-shaped bars, the cultivators connected to said shafts, and the stay rods connected to the pole and said L-shaped bars, substantially as specified.

10. The combination of the wheeled axle, the draft pole attached thereto, the substantially vertical shafts connected to the axle at their lower ends and connected to the draft pole at their upper ends, and the cultivator beams loosely connected to said shafts, substantially as described; with the spring supports for the beam consisting of a flat spring and parallel sliding rods respectively connected at one end to the frame and beam, and at their opposite ends to opposite ends of the spring, whereby the latter is bowed as the rods are drawn apart longitudinally, substantially as set forth.

11. The combination of the wheeled axle, the L-shaped bars attached thereto, the draft pole, the cross bar thereof, the vertical shafts connected at top to the ends of the cross bar and at bottom to the L-shaped bars, the stay rods, and the cultivator beams, the connections between said beams and the shafts, and the springs for upholding said beams, all substantially as set forth.

In testimony that I claim the foregoing as my own I affix my signature in presence of two witnesses.

JOHN I. HOKE.

Witnesses:
JAMES DU SHANE,
ROBERT W. BAST.